US006258448B1

(12) United States Patent
Hare

(10) Patent No.: US 6,258,448 B1
(45) Date of Patent: Jul. 10, 2001

(54) SILVER HALIDE PHOTOGRAPHIC TRANSFER ELEMENT

(75) Inventor: Donald S. Hare, East Brunswick, NJ (US)

(73) Assignee: Foto-Wear, Inc., Milford, PA (US)

( * ) Notice: Subject to any disclaimer, the term of this patent is extended or adjusted under 35 U.S.C. 154(b) by 0 days.

(21) Appl. No.: 08/479,409

(22) Filed: Jun. 7, 1995

Related U.S. Application Data

(62) Division of application No. 08/206,218, filed on Mar. 7, 1994, now abandoned, which is a continuation of application No. 07/405,298, filed on Sep. 11, 1989, now abandoned.

(51) Int. Cl.$^7$ .............................. B32B 7/06; B32B 7/10; G03C 1/805

(52) U.S. Cl. .......................... 428/199; 428/200; 428/914; 430/259; 156/239; 156/240

(58) Field of Search .................................... 156/230, 239, 156/240, 247, 277, 289; 428/202, 914, 199, 200; 430/256, 259

(56) References Cited

U.S. PATENT DOCUMENTS

| | | | |
|---|---|---|---|
| 1,228,680 * | 6/1917 | Kent | 430/256 |
| 2,528,395 | 10/1950 | Slifkin . | |
| 3,453,111 | 7/1969 | Yackel . | |
| 3,918,895 | 11/1975 | Mizuno et al. . | |
| 3,982,940 | 9/1976 | Kinjo et al. . | |
| 4,033,770 | 7/1977 | De Haes et al. . | |
| 4,064,285 | 12/1977 | Mammino . | |
| 4,142,929 | 3/1979 | Otomine et al. . | |
| 4,167,392 | 9/1979 | Defago . | |
| 4,216,286 | 8/1980 | Greene et al. . | |
| 4,224,358 | 9/1980 | Hare . | |
| 4,226,927 | 10/1980 | Kinderman et al. . | |
| 4,234,673 | 11/1980 | Scrutton et al. . | |
| 4,235,657 | 11/1980 | Greenman et al. . | |
| 4,284,456 | 8/1981 | Hare . | |

(List continued on next page.)

FOREIGN PATENT DOCUMENTS

| | | | |
|---|---|---|---|
| 85100891 * | 7/1986 | (CN) | G03C/1/80 |
| 1932056 | 1/1970 | (DE) . | |
| 1306374 | 2/1973 | (GB) . | |
| 1546753 | 5/1979 | (GB) . | |
| 50-62700 | 5/1975 | (JP) . | |
| 50-108010 | 8/1975 | (JP) . | |
| 50-108011 | 8/1975 | (JP) . | |
| 2027735 | 2/1987 | (JP) . | |
| 63-137897 | 6/1988 | (JP) . | |
| 63-173054 * | 7/1988 | (JP) . | |

OTHER PUBLICATIONS

A. Standen "Natural Resins", Encyclopedia of Polymer Science and Technology, vol. 12, p. 90, 1970.*

A. Standen, "Natural Resins", 1970, Encyclopedia of Polymer Science and Technology, vol. 12, p. 90.

*Primary Examiner*—Curtis Mayes
(74) *Attorney, Agent, or Firm*—Birch, Stewart, Kolasch & Birch, LLP.

(57) ABSTRACT

The present invention relates to a silver halide photographic transfer element which comprises a support having a front and rear surface, a transfer coating on the front of the support comprising a material capable of holding an image that can be transferred to a receptor surface upon the application of energy to the rear surface of the support, and at least one silver halide light sensitive emulsion layer on said front surface of the support. The invention is also directed to a method for applying a photographic image to a receptor element by the steps of exposing imagewise and then developing the above-described silver halide photographic transfer element, positioning the developed photographic element against a receptor element, and applying energy to the rear surface of the silver halide photographic element to transfer a photographic image to the receptor element.

15 Claims, 1 Drawing Sheet

U.S. PATENT DOCUMENTS

| | | | | |
|---|---|---|---|---|
| 4,322,467 | | 3/1982 | Heimbach et al. . | |
| 4,407,932 | | 10/1983 | Loder et al. . | |
| 4,430,416 | | 2/1984 | Goto et al. . | |
| 4,555,436 | | 11/1985 | Geurtsen et al. . | |
| 4,756,988 | | 7/1988 | Kausch et al. . | |
| 4,773,953 | * | 9/1988 | Hare | 156/240 |
| 4,838,965 | | 6/1989 | Bussard . | |
| 4,863,781 | | 9/1989 | Kronzer . | |
| 4,865,938 | | 9/1989 | Sakai et al. . | |
| 4,880,678 | | 11/1989 | Goffi . | |
| 6,033,824 | * | 3/2000 | Hare et al. . | |
| 6,090,520 | * | 3/2000 | Hare et al. . | |

* cited by examiner

SILVER HALIDE PHOTOGRAPHIC TRANSFER ELEMENT

This application is a continuation X divisional of application Ser. No. 08/206.218 filed on Mar. 7, 1994 , now abandoned which is a Continuation application under 37 CFR 1.62 of prior application Ser. No. 07/405,298 filed on Sep. 11, 1989 now abondonded the entire contents of which are hereby incorporated by reference.

BACKGROUND OF THE INVENTION

1. Field of the Invention

The present invention relates to a silver halide photographic transfer element and to a method of applying a photographic image to a receptor element. More specifically, the present invention relates to photographic films or prints having images which are capable of being directly transferred to, for instance, a textile such as a shirt or the like without requiring the use of commercial equipment, such as video cameras, computers, color copiers, home and/or lithographic printers.

2. Description of the Prior Art

Textiles such as shirts (e.g., tee shirts) having a variety of designs thereon have become very popular in recent years. Many shirts are sold with pre-printed designs to suit the tastes of consumers. In addition, many customized tee shirt stores are now in business which permit customers to select designs or decals of their choice. Processes have also been proposed which permit customers to create their own designs on transfer sheets for application to tee shirts by use of a conventional iron, such as described in U.S. Pat. No. 4,244,3584 issued Sep. 23, 1980, to the present inventor. Furthermore, U.S. Pat. No. 4,773,953 issued Sep. 27, 1988, to the present inventor is directed to a method for utilizing a personal computer, a video camera or the like to create graphics, images, or creative designs on a fabric.

Therefore, in order to attract the interest of consumer groups which are already captivated by the tee shirt rage described above, the present inventor provides the capability of transferring photographic images directly to a receiver element using a material capable of holding and transferring an image. A unique advantage of the invention is to enable all consumers to wear and display on apparel their favorite moments captured on film and to do so in the single most cost and time efficient means.

SUMMARY OF THE INVENTION

Accordingly, the present invention is directed to a silver halide photographic transfer element which comprises a support having a front and rear surface, a transfer coating layer on the front surface of the support comprising a material capable of holding an image that can be transferred to a receptor surface upon the application of energy to the rear surface of the support, and at least one silver halide light sensitive emulsion layer on the front surface of the support.

The silver halide photographic element of the invention is applicable to color paper (e.g., print and reversal), color negative film, color reversal film, color diffusion transfer film units (e.g., instant type prints), black and white film or paper, or the like.

The receptor surface for the image may be a textile such as a shirt (e.g., tee shirt) or the like.

Preferably, the transfer coating layer is located between the support and the at least one silver halide light sensitive emulsion layer.

The thickness of the transfer coating layer is preferably about ½ mil to 2 mil and more preferably about 1 mil.

The method for applying a photographic image to a receptor element comprises the steps of:

(a) exposing imagewise a silver halide photographic transfer element comprising a support having a front surface and a rear surface, a transfer coating layer on the surface and a rear surface, a transfer coating layer on the front surface of the support comprising a material capable of holding an image that can be transferred to a receptor surface upon the application of energy to the rear surface of the support, and at least one silver halide light sensitive emulsion layer on the front surface of the support, (b) developing the imagewise exposed silver halide light sensitive photographic element to form a photographic image, (c) positioning the front surface of the silver halide photographic element against the receptor element, and (d) applying energy to the rear surface of the silver halide photographic element to transfer the photographic image to said receptor element.

The transfer coating layer of the silver halide photographic element preferably comprises a Singapore Dammar type resin.

The type of energy used for transferring the photographic image to the receptor element is preferably heat or pressure.

BRIEF DESCRIPTION OF THE DRAWINGS

The present invention will become more fully understood from the detailed description given hereinbelow, and the accompanying figures which are given by way of illustration only, and thus are not limitative of the present invention, and wherein:

FIG. 2 illustrates the step of ironing the silver halide photographic transfer element onto a tee shirt or the like.

DETAILED DESCRIPTION OF THE INVENTION

Figure 1:
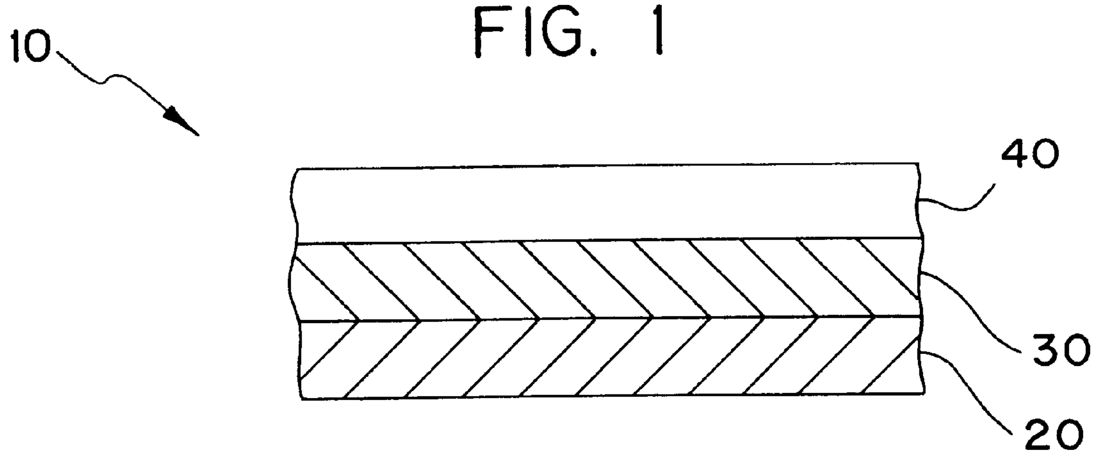
FIG. 1 is a cross-sectional view of the preferred embodiment of the silver halide photographic transfer element of the present invention.

Referring to FIG. 1, there is generally illustrated a cross-sectional view of the silver halide photographic transfer element 10 of the present invention. The transfer element 10 comprises a suitable support or substrate 20 which may be any type of material ordinarily used as a support for photographic materials. Examples thereof include cellulose acetate films, cellulose acetate propionate films, cellulose nitrate films, cellulose acetate butyrate films, polyethylene terephthalate films, polystyrene films, polycarbonate films, and laminated sheets of these films and papers. Suitable papers include papers coated with a polymer of an alpha olefin and preferably an alpha olefin having 2 to 10 carbon atoms, such as polyethylene, polypropylene, etc., and baryta-coated papers, etc.

A transfer coating of a release material 30 capable of holding a developed image which can then be transferred to a receptor surface is coated on the support or substrate. The release material provides a colorfast image when transferred to the receptor surface. Suitable release materials include but are not limited to Singapore Dammar resin (m.p. 115° C.), Batavia Dammar resin (m.p. 105° C.), accord (yucca) resin (m.p. 1300° C.), East India resins (m.p. 140–1740° C.), Kauri resins (m.p. 130–160° C.), Manila resins (m.p.

120–130° C.), Pontianak (m.p. 135° C.), and acrylics. A preferable release material which is coated on the support is Singapore Dammar resin.

The release material may be coated on the support in any desired thickness by any suitable conventional coating technique (e.g., spin coating, rollers such as graveuer or rubber, spray or knife application). Preferably, the release material is in the range of about ½ mil to 2 mil in thickness when dry, and more preferably, the thickness of the release coating is about 1 mil.

The release coating may be optionally coated on known transfer papers such as a transfer paper manufactured by Kimberly-Clark Corporation under the trademark "TRANSEEZE". Alternatively, the silver halide light sensitive emulsion layers may be directly coated onto known types of transfer papers having suitable properties as the coated supports of the present invention. Thus, "TRANSEEZE" per se may be suitable as a support and transfer coating layer for the present invention.

The photographic support or substrate which is coated with the transfer coating (e.g., release coating) is subsequently coated with the desired photographic emulsions in a conventional manner by methods known to one of ordinary skill in the art.

One preferred application of this invention is directed to photographic transfer elements capable of producing multicolor dye images. Such a photographic transfer element comprises a support, a transfer coating (e.g., release coating layer such as Singapore Dammar resin) and a plurality of color forming layers coated thereon. The color forming layers include at least one blue recording yellow dye image forming layer, at least one green recording magenta dye image forming layer, and at least one red recording cyan dye image forming layer. Each image forming layer includes at least one silver halide emulsion layer. A dye image providing material can be located in the emulsion layer, in an adjacent layer, or introduced during development. The blue sensitive emulsion layers can rely on native sensitivity to blue light or contain a blue sensitizing dye adsorbed to the silver halide grains of the blue sensitive layers. Spectral sensitizing dyes capable of absorbing green and red light are adsorbed to silver halide grain surfaces in the emulsions of the green and red recording color forming layers, respectively.

To prevent color contamination of adjacent color layers, oxidized development product scavengers including an oxidized developing agent and oxidized electron transfer agents can be incorporated at any location in the color forming layers or in an interlayer separating adjacent color forming layers. Suitable scavengers include alkyl substituted aminophenols and hyroquinones as disclosed in U.S. Pat. Nos. 2,336,327 and 2,937,086, sulfoalkyl substituted hydroquinones as disclosed in U.S. Pat. No. 2,701,197, and sulfonamido substituted phenols as disclosed in U.S. Pat. No. 4,205,987.

The order of the photographic layers on the support is any order conventional in the art. For example, in color print paper, the order of layers starting from the support is a blue sensitive layer, an interlayer, a green sensitive layer, an U.V. layer, a red sensitive layer, an U.V. layer and a surface overcoat.

In the photographic materials of the present invention various conventionally known hydrophilic colloids are used. Examples of typical hydrophilic colloids used as the binders for photographic silver halide emulsions and other emulsions such as non-light sensitive emulsions (e.g., surface overcoat, interlayers, etc.) for the photographic layers include gelatin; sugar derivatives such as agar agar, sodium alginate, starch derivatives, etc.; casein; cellulose derivatives such as carboxymethyl cellulose, hydroxyethyl cellulose etc.; colloidal albumin; synthetic hydrophilic colloids such as polyvinyl alcohol, poly-N-vinylpyrrolidone, polyacrylic acid copolymer, maleic anhydride copolymers, polyacrylamide, and the derivatives or partially hydrolyzed products thereof. A mixture of two or more of these colloids may be used when the combination is compatible with each other.

Gelatin is generally used in the hydrophilic colloid layers of the photographic materials. However, gelatin may be replaced partially or wholly with a synthetic polymer. Examples of synthetic polymers include water-dispersed vinyl polymers in the form of a latex, including compounds capable of increasing dimensional stability of the photographic materials when used in place of or together with a hydrophilic water permeable colloid.

The silver halide photographic emulsion used in the present invention may be prepared by mixing an aqueous solution of a water-soluble silver salt such as silver nitrate with an aqueous solution of a water soluble halogen salt such as potassium bromide in the presence of a water soluble polymer solution such as an aqueous solution of gelatin. The silver halide may be silver chloride, silver bromide, etc., or mixed silver halides such as silver chlorobromide, silver chloriodide, etc. These silver halide grains may be prepared according to conventionally known processes. Examples of such known processes include the so-called single jet method, the so-called double jet method, or the controlled double jet method. In addition, two or more different silver halide emulsions separately prepared may be used together.

The silver halide photographic emulsions may also contain compounds to prevent the formation of fog during production, processing or preserving the photographic material, and to prevent a reduction in sensitivity. Suitable compounds for this purpose include 1-phenyl-5-mercaptotetrazole, 3-methylbenzothiazole, 4-hydroxy-6-methyl-1,3,3a,7-tetrazaindene and many metal salts, mercury-containing compounds, mercapto compounds and heterocyclic compounds, etc.

The silver halide emulsions may be chemically sensitized in a conventionally known manner. Suitable chemical sensitizers include gold compounds such as gold trichloride, salts of noble metals such iridium and rhodium; sulfur compounds capable of forming silver sulfide by causing reaction with a silver salt such as sodium thiosulfate; amines, stannous salts, and other reducing compounds.

Moreover, the silver halide photographic emulsions may be spectrally sensitized or super dye sensitized using cyamine dyes such as merocyanine, carbocyanine, or cyanine alone or in combinations thereof or using a combination of cyanine dyes and styryl dyes. The selection of such dyes depends upon the object and use of the photographic materials including the desired sensitivity and the wavelength regions.

The hydrophilic colloid layers may be hardened with cross-linking agents such as vinyl sulfate compounds, active halogen compounds, carboiimide compounds, etc.

The dye forming couplers suitably used in this invention include cyan, magenta and yellow dye forming couplers. These couplers may be 4-equivalent couplers or 2-equivalent couplers as described in U.S. Pat. Nos. 3,458,315 and 3,277,155.

Examples of suitable yellow dye-forming couplers include those described in U.S. Pat. Nos. 3,384,657, 3,277,155, 3,253,924, 3,227,550, 4,026,706, 2,428,054, 2,908,573, 2,778,658, 2,453,661 and 2,499,966.

Examples of suitable magenta dye forming couplers include those described in U.S. Pat. Nos. 4,026,706, 2,725,292, 3,227,550, 2,600,788, 3,252,924, 3,062,653, 2,908,573, 3,152,896 and 3,311,476.

Examples of suitable cyan dye forming couplers which can be used in the invention include those described in U.S. Pat. Nos. 3,043,892, 4,026,706, 2,275,292, 3,253,294, 2,474,293, 3,227,550, 2,423,730, 2,908,573 and 2,895,826.

A further general discussion of suitable couplers is described in *Photographic Chemistry* by Glafkides, volume 2, pages 596–615 and *Encyclopedia of Chemical Technology*, Vol. 5, p. 822–825.

Dyes may be formed by the reaction of the couplers with an oxidized aromatic primary amine silver halide developing agent during conventional processing. Typical processing steps for color negative films and color print papers are development, bleach, fix, washing, optionally stabilization and then drying. Two or more of these steps may be combined into a single step. For instance, the bleaching and fixing steps may be combined into a single bleach-fix step. Color development is usually carried out in an alkaline solution containing an aromatic primary amine developing agent such as aminophenol, phenylenediamine or a mixture thereof.

Where it is desired to reverse the sense of the color image, such as in color slide processing, reversal processing can be undertaken. A typical sequence for reversing color processing includes black and white development, stop, washing, fogging, washing, color development, washing, bleaching, fixing, washing, stabilizing and drying. An optional prehardening bath prior to black and white development may be employed. The washing step can be omitted or relocated in the sequence. The fogging bath can be replaced by uniform light exposure or by the use of a fogging agent in the color development step to render the silver halide not developed in the black and white step developable.

When the color photographic material of the present invention is a color photographic diffusion transfer film unit the processing of the photographic material is carried out automatically in the photographic material. In these instant product type units, the color developer containing a color developing agent is contained in a rupturable container. Suitable developing agents include 1-phenyl-4-methyl-hydroxymethyl-3-pyrazolidone,1-phenyl-3-pyrazolidone, N-methylamino-phenol,1-phenyl-4,4-dimethyl-3-pyrazolidone, and 3-methoxy-N, N-diethyl-p-phenylene-diamine.

Accordingly, in order to form color images in photographic materials various known methods can be used, including the coupling reaction of the above-described dye-forming color couplers and the oxidation products of a p-phenylenediamine series color developing agent; the oxidation cleavage reaction of DRR compounds, the dye releasing reaction upon coupling of DDR couplers; the dye forming reaction upon the coupling reaction of DDR couplers and a silver dye bleaching process.

Therefore, the present invention can be applied Ito various types of color photographic materials such as color positive films, color papers, color negative films, color reversal films, color diffusion transfer film units, silver dye bleaching photographic materials, black and white films and papers, etc.

Methods for preparing silver halide photographic elements of the present invention are well known in the art. Representative methods thereof are set forth in U.S. Pat. Nos. 4,822,728, 4,743,533, 4,710,455, 4,705,747, 4,680,247, 4,659,647, 4,654,293, 4,636,457, 4,634,663, 4,619,884, 4,588,672, 4,565,778, 5,552,834, 4,529,69, 4,459,353, 4,499,174, 4,144,070, 4,379,837 and Reissue 32,149.

The following examples are provided for a further understanding of the invention, however, the invention is not to be construed as being limited thereto.

EXAMPLE 1

A silver halide photographic transfer element is prepared as follows. A 1 mil thick layer of Singapore Dammar resin is coated on a paper support coated with polyethylene on both surfaces thereof. A conventional package of color paper silver halide photographic light sensitive emulsions is coated thereon.

All quantities below are in terms of grams per square meter unless otherwise specified.

Layer 1 comprises 1.5 g of gelatin, 0.32 g of a blue-sensitive silver chlorobromide emulsion, and 0.3 g of dioctyl phthalate (DOP) in which $1.2\times10^{-3}$ mol of α-(1-benzyl-2-phenyl-3,5-dioxo-1,2,4-triazolidinyl)-α-pivalyl-2-chloro-5-[α-(dodecyloxycarbonyl)ethoxycarbonyl]acetanilide as a yellow coupler and 0.015 g of 2,5-di-t-ocytl hydroquinone (HQ).

Layer 2 is an interlayer which comprises 0.9 g of gelatin and 0.6 g of DOP in which 0.09 of HQ is dissolved.

Layer 3 comprises 1.3 g of gelatin, 0.27 g of a green sensitive silver chlorobromide emulsion, and 0.2 g of DOP in which $0.59\times10^{-3}$ mol of 1-(2,4,6-trichlorophenyl)-3-(2-chloro-5-octadecylsuccinimide-anilino)-5-pyrazolone as a magenta coupler and 0.015 g of HQ are dissolved.

Layer 4 comprises 1.5 g of gelatin and 0.6 g of DOP in which 0.8 g benzophenone as an ultraviolet absorbent and 0.04 g of HQ are dissolved.

Layer 5 comprises 1.6 g of gelatin, 0.3 g of a red sensitive silver chlorobromide emulsion and 0.2 g of DOP in which $0.75\times10^{-3}$ mol of 2,4-dichloro-3-methyl-6-[α-(2,4-di-t-amylphenoxy)-butylamide]phenol as a cyan coupler and 0.005 g of HQ are dissolved.

Layer 6 is a surface overcoat (e.g., protective layer) and comprises 1.0 g of gelatin.

The color print paper thus produced is exposed to light through a standard negative.

The exposed color print paper sample is processed as follows. The sample is processed in a color developer having a temperature of 33° C. for 3.5 minutes. The developed sample is placed in a solution of bleach-fix at a temperature of 33° C. for 1.5 minutes. The sample is washed for 3 minutes with water maintained at 30–34° C. Finally, the sample is dried for 2 minutes at a temperature of 60–80° C.

The composition of the above-mentioned color developer is listed below:

| | |
|---|---|
| Pure water | 800 ml |
| Ethylene glycol | 15 ml |
| Benzyl alcohol | 15 ml |
| Hydroxylamine sulfate | 2 g |
| Potassium carbonate | 32 g |
| Potassium bromide | 0.65 g |
| Sodium chloride | 1.0 g |
| Potassium sulfite | 2.0 g |
| N-ethyl-N-beta-methanesulfonamide ethyl-3-methyl-4-aminoaniline sulfate | 4.5 g |
| Whitex BB (in 50% aqueous solution) | 2 ml |

-continued

| | |
|---|---|
| (Optical whitening agent, mfd. by Sumitomo Chemical Ind. Co. Ltd., Japan) | |
| 1-hydroxyethylidene-1,1 diphosphonic acid (in 60% aqueous solution) | 2 ml |

Pure water is added therein to make 1 liter and the pH value thereof is adjusted by the use of 10% potassium hydroxide or dilute sulfuric acid solution to pH=10.1.

The composition of the bleach-fix solution is listed below:

| | |
|---|---|
| Pure water | 550 ml |
| Color Developer | 200 ml |
| Iron (III) ammonium ethylenediamine tetraacetic acid | 65 g |
| Ammonium thiosulfate | 85 g |
| Sodium hydrogensulfite | 10 g |
| Sodium metahydrogensulfite | 2 g |
| Di-ethylenediaminetetraacetate | 12 g |
| Sodium bromide | 10 g |
| Potassium chloride | 1.0 g |

Pure water is added thereto to make 1 liter and the pH value is adjusted to pH=7.0 with the use of dilute sulfuric acid or concentrated aqueous ammonia.

EXAMPLE 2

Figure 2:
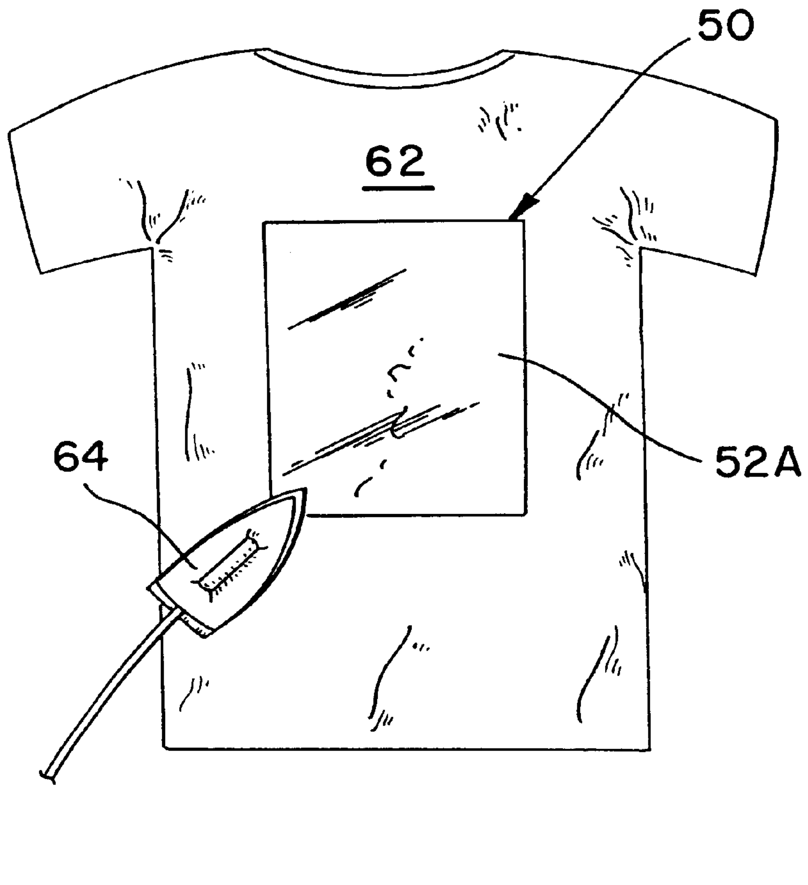

Referring to FIG. 2, the method of applying a photographic image to a receptor element will be described. More specifically, FIG. 2 illustrates how the step of heat transfer from the silver halide photographic transfer element (50) to a tee shirt or fabric (62) is performed.

The silver halide photographic transfer element is prepared, exposed and developed to form a photographic image as in Example 1. A tee shirt (62) is laid flat, as illustrated, on an appropriate support surface, and the front surface of the silver halide photographic transfer element (50) is positioned onto the tee shirt. An iron (64) is run and pressed across the back (52A) of the silver halide photographic transfer element. The image is transferred to the tee shirt and the support is removed and discarded.

EXAMPLE 3

An integral imaging receiver (IIR) element is prepared by coating the following layers in the order recited on a transparent poly(ethylene terephthalate) film support. Quantities are parenthetically given in grams per square meter unless otherwise stated.

(1) Image receiving layer of poly(styrene-co-N-benzyl-N,N-dimethyl-N-vinylbenzyl-ammonium chloride-co-divinylbenzene) (molar ratio 49/49/2) (1.1) and gelatin (1.2);

(2) Image receiving layer of poly(styrene-co-l-vinylimidazole-co-3-benzyl-l-vinylimidazolium chloride) (50:40:10 mole ratio) (1.6) and gelatin (0.75);

(3) Reflecting layer of titanium dioxide (17) and gelatin (2.6);

(4) Opaque layer of carbon black (0.95) and gelatin (0.65);

(5) Gelatin interlayer (0.54);

(6) Transfer coating of Singapore Dammar resin (1 mil);

(7) Gelatin interlayer (0.65);

(8) Cyan redox dye-release layer, (9) Gelatin interlayer

(10) Red sensitive silver halide emulsion layer;

(11) Gelatin interlayer;

(12) Magenta-redox dye-releaser layer;

(13) Green-sensitive silver halide emulsion layer;

(14) Gelatin interlayer;

(15) Yellow redox dye-releaser layer;

(16) Blue-sensitive silver halide emulsion layer; and

(17) Gelatin overcoat layer.

Layers 8–17 are similar to those described in Example I of U.S. Pat. No. 4,356,250.

A cover sheet and processing pod are prepared and assembled into film assemblages. (For example, see Example I of U.S. Pat. No. 4,356,250).

The above film assemblages are exposed to a test object. The assemblages are processed in a conventional manner by spreading the contents of the processing pod between the cover sheet and the Integral Imaging Receiver by using a pair of juxtaposed rollers.

EXAMPLE 4

The method of Example 2 is repeated using the IIR element of Example 3. A tee shirt is laid flat on a suitable support surface and the front surface of the IIR element is positioned onto the tee shirt. An iron is run and pressed across the back of the IIR element and the image is transferred to the tee shirt.

EXAMPLE 5

A multilayer light sensitive color reversal element comprising layers having the following composition is coated on a cellulose triacetate film support.

(1) A transfer layer of Singapore Dammar resin having a thickness of about 1 mil.

(2) An antihalation layer comprising gelatin containing black colloidal silver at a silver coating weight of 0.2 $g/m^2$.

(3) A red sensitive low speed emulsion layer of gelatin comprising a silver bromo-iodide emulsion (silver iodide: 7% by mol; average grain size: 0.65 u) at a silver coating weight of 0.62 $g/m^2$ and a silver/gelatin ratio of 0.30, sensitizing dye I in an amount of 0.000135 mol per mol of silver, sensitizing dye II in an amount of 0.000316 mol per mol of silver, Coupler A in an amount of 0.211 mol per mol of silver dispersed in tricresylphosphate and diethylauramide.

(4) A red sensitive high speed emulsion layer of gelatin comprising a silver bromo-iodide emulsion (silver iodide: 7% by mol; average grain size: 1.18 u) at a silver coating weight of 0.57 $g/m^2$ and a silver/gelatin ratio of 0.30, sensitizing dye I in amount of 0.000123 mol per mol of silver, Coupler A in an amount of 0.221 mol per mol of silver dispersed in tricresylphosphate and diethyl-lauramide.

(5) An intermediate layer of gelatin comprising 2,5-ditert-octylhydroquinone dispersed in tricresylphosphate.

(6) A green sensitive high speed emulsion layer of gelatin comprising a silver bromo-iodide emulsion (silver iodide: 7% of mol, average grain size: 1.18 u) at a silver coating weight of 0.63 $g/m^2$ and a silver/gelatin ratio of 0.46, sensitizing dye III in an amount of 0.000866 mol per mol of silver sensitizing dye IV in an amount of 0.000190 mol per mol of silver, Coupler B in an amount of 0.183 mol per mol of silver.

(7) A green sensitive low speed emulsion layer of gelatin comprising a blend of a silver bromo-iodide emulsion (silver iodide: 7% by mol; average grain size: 0.65 u) and a silver bromo-iodide emulsion (silver iodide: 5% by mol; average grain size: 0.29 u) at a total silver coating weight of 0.46 $g/m^2$ and a total silver/gelatin ratio of 0.41, sensitizing dye III in an amount of 0.000935 mol per mol of silver, sensitizing dye IV in an amount of 0.00021 mol per mol of silver and Coupler B in an amount of 0.132 mol per mol of silver.

(8) An intermediate layer the same as layer (5).

(9) A yellow filter layer of gelatin comprising dispersed yellow colloidal silver.

(10) A blue sensitive high speed emulsion layer of gelatin comprising a blend of a silver bromo-iodide emulsion (silver iodide: 7% by mol, average grain size: 1.18 u) and a silver bromo-iodide emulsion (silver iodide: 14% by mol; average grain size: 1.4 u) at a total silver coating weight of 0.85 $g/m^2$ and a total silver/gelatin ratio of 0.52, sensitizing dye V in an amount of 0.00015 mol per mol of silver, Coupler C in an amount of 0.145 mol per mol of silver and Coupler D in an amount of 0.071 mol per mol of silver both dispersed in tricresylphosphate and diethylalauramide.

(11) A blue sensitive low speed emulsion layer of gelatin comprising a silver bromo-iodide emulsion (silver iodide: 7% by mol; average gram size: 0.65 u) at a silver coating weight of 0.55 $g/m^2$ and a silver/gelatin ratio of 0.46, sensitizing dye V in an amount of 0.000133 mol per mol of silver, Coupler C in an amount of 0.147 mol per mol of silver and Coupler D in an amount of 0.071 mol per mol of silver both dispersed in tricresylphosphate and diethyllauramide.

(12) A protective layer of gelatin comprising polymethylmethacrylate particles of mean diameter 2 u and 2-(2'-hydroxy-3'5'-di-t-butylphenyl)-5-t-butylbenzotriazole UV absorber dispersed in tricresylphosphate and dibutylphthalate.

Gelatin hardeners, surface active agents, antifogging and stabilizing agents are also added to the layers.

The element is exposed and processed through a reversal color process E6 described in "Using Process E6, Kodak Publication N2–119".

Compounds which may be used for preparing the above-described element are the following.

Sensitizing Dye I:

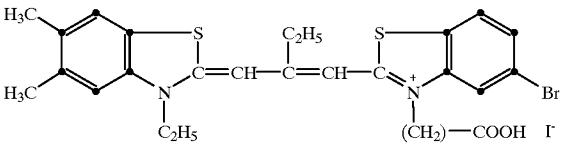

Sensitizing Dye II:

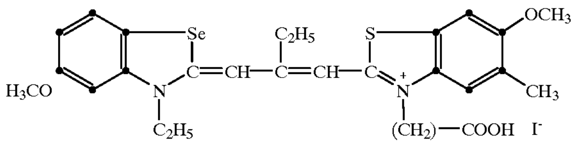

Coupler A:

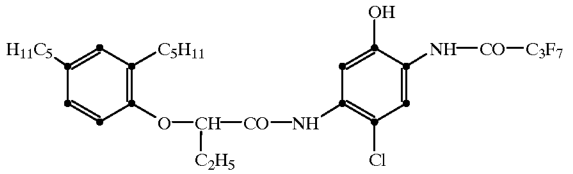

Sensitizing Dye III:

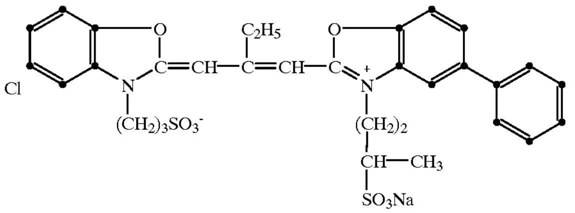

Sensitizing Dye IV:

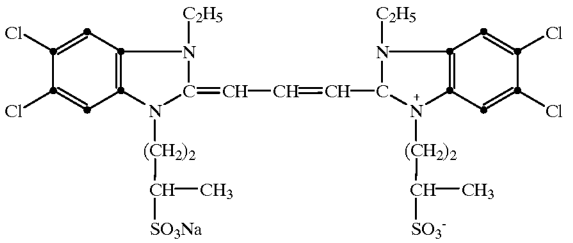

Coupler B:

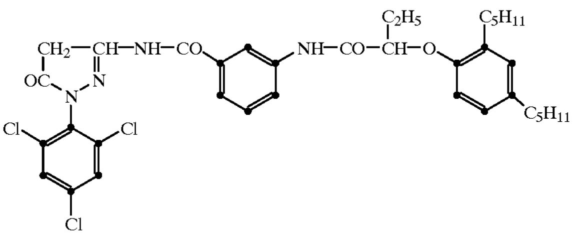

Sensitizing Dye V:

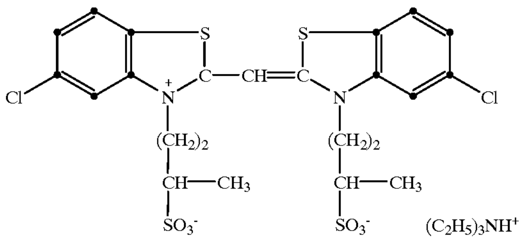

Coupler C:

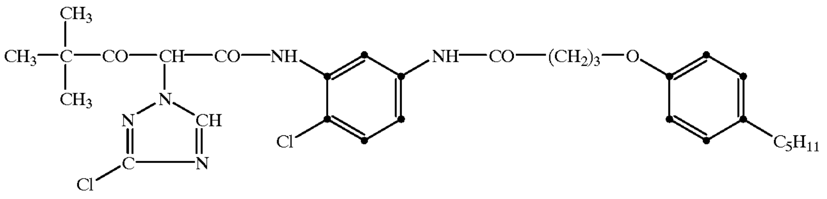

Coupler D:

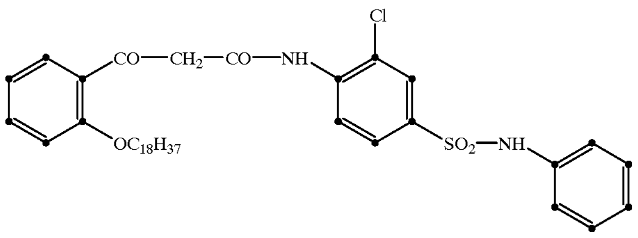

EXAMPLE 6

The multilayer light sensitive color reversal element of Example 5 is applied to a tee shirt in the manner set forth in Example 2.

All cited patents and publications referred to in this application are herein incorporated by reference.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A silver halide photographic element, which comprises:

a support having a front and rear surface, a heat activated transfer coating layer which is at least 0.5 mil in thickness on said front surface of the support which is a material capable of transferring and adhering developed image and non-image areas from said front surface of said support upon the application of heat energy to the rear surface of the support, said heat activated transfer coating layer capable of stripping from said front surface of the support by liquefying and releasing from said support when heated, said liquefied transfer coating layer providing adherence to a fabric receptor element by flowing onto said fabric receptor element and solidifying thereon, said transfer coating layer being capable of providing colorfast images, wherein the transfer coating layer is provided on the support without an intervening release layer; and at least one silver halide light sensitive emulsion layer on said heat activated transfer coating, said adherence does not require an external adhesive layer and occurs in an area at least coextensive with the area of said at least one silver halide light sensitive emulsion layer.

2. The silver halide photographic element of claim 1, wherein the silver halide light sensitive emulsion layer is a color light sensitive photographic layer applicable on color negative film, color reversal film, color reversal paper, color positive film or color print paper.

3. The silver halide photographic element of claim 1, wherein the silver halide light sensitive emulsion layer is a light sensitive photographic layer applicable on color diffusion transfer film units.

4. The silver halide photographic element of claim 1, wherein the silver halide light sensitive emulsion layer is a light sensitive photographic layer applicable on a black and white film or paper photosensitive material.

5. The silver halide photographic element of claim 1, wherein the transfer coating layer is selected from the group consisting of Batavia Dammar resin, accord resin, East India resin, Kauri resin, Manila resin, Pontianak resin and acrylic resin.

6. The silver halide photographic element of claim 1, wherein the heat activated transfer coating layer comprises an acrylic resin.

7. The silver halide photographic element of claim 1, wherein the thickness of the transfer coating layer is about ½ mil to 2 mil.

8. The silver halide photographic element of claim 1, wherein the thickness of the transfer coating layer is about 1 mil to 2 mil.

9. The silver halide photographic element of claim 1, wherein the receptor elememt is textile, leather, ceramic or wool.

10. The silver halide photographic element of claim 9, wherein the textile is a shirt.

11. The silver halide photographic element of claim 1, wherein said support and transfer coating layer are a heat transfer product known as TRANSEEZE and said at least one silver halide light sensitive emulsion layer is on said TRANSEEZE.

12. In a silver halide photographic element comprising a support having a front and rear surface and at least one silver halide light sensitive emulsion layer, wherein the improvement comprises a heat activated transfer coating layer which is at least 0.5 mil in thickness on said front surface of said support which is a material capable of transferring and adhering developed image and non-image areas from said front surface of said support upon the application of heat energy to the rear surface of the support, said heat activated transfer coating layer capable of stripping from said front surface of the support by liquefying and releasing from said support when heated, said liquefied transfer coating layer providing adherence to a fabric receptor element by flowing onto fabric said receptor element and solidifying thereon, said adherence does not require an external adhesive layer and occurs in an area at least coextensive with the area of said at least one silver halide light sensitive emulsion layer, wherein the transfer coating layer provides colorfast images, and wherein there is no intervening release layer between the transfer coating layer and said support.

13. The silver halide photographic element of claim 12, wherein the transfer coating layer comprises Singapore Dammar resin.

14. The silver halide photographic element of claim 12, wherein the heat activated transfer coating layer comprises an acrylic resin.

15. The silver halide photographic element of claim 12, wherein the thickness of the transfer coating layer is about 0.5 mil to 2 mil.

* * * * *